United States Patent
Gustafsson et al.

(10) Patent No.: US 11,379,042 B2
(45) Date of Patent: Jul. 5, 2022

(54) TRANSMISSION OF HAPTIC INPUT

(71) Applicant: Telefonaktiebolaget LM Ericsson (publ), Stockholm (SE)

(72) Inventors: Harald Gustafsson, Lund (SE); Jose Araujo, Stockholm (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 73 days.

(21) Appl. No.: 16/622,930

(22) PCT Filed: Jul. 10, 2017

(86) PCT No.: PCT/EP2017/067199
§ 371 (c)(1),
(2) Date: Dec. 16, 2019

(87) PCT Pub. No.: WO2019/011396
PCT Pub. Date: Jan. 17, 2019

(65) Prior Publication Data
US 2021/0149488 A1 May 20, 2021

(51) Int. Cl.
*G06F 3/01* (2006.01)
*G06F 3/041* (2006.01)

(52) U.S. Cl.
CPC .............. *G06F 3/016* (2013.01); *G06F 3/011* (2013.01); *G06F 3/0416* (2013.01)

(58) Field of Classification Search
CPC ......... G06F 3/016; G06F 3/011; G06F 3/0416
See application file for complete search history.

(56) References Cited

U.S. PATENT DOCUMENTS

2010/0231539 A1* 9/2010 Cruz-Hernandez ........................ G06F 3/0483 345/173
2011/0032088 A1 2/2011 Kim et al.
(Continued)

FOREIGN PATENT DOCUMENTS

| EP | 2849032 A1 | 3/2015 |
|---|---|---|
| EP | 3118723 A1 | 1/2017 |
| WO | 2010009149 A2 | 1/2010 |

OTHER PUBLICATIONS

PCT International Search Report, dated Nov. 9, 2017, in connection with International Application No. PCT/EP2017/067199, all pages.
(Continued)

*Primary Examiner* — Jennifer N Welch
*Assistant Examiner* — K C Chen
(74) *Attorney, Agent, or Firm* — Leffler Intellectual Property Law, PLLC (57) ABSTRACT

A method for use in a system comprising a transmitting haptic device, comprising a first haptic presentation device having an original set of haptic presentation properties, and a receiving haptic device, comprising a second haptic presentation device having a set of haptic presentation properties, said method comprising receiving haptic content in said transmitting haptic device; obtaining an alignment point for the haptic content according to said original haptic presentation properties; transmitting the haptic content to said second haptic device; obtaining a corresponding point to said alignment point according to the set of haptic presentation properties for the receiving haptic device; and presenting the haptic content in the receiving haptic device at the corresponding point.

18 Claims, 7 Drawing Sheets

(56) References Cited

U.S. PATENT DOCUMENTS

| | | | |
|---|---|---|---|
| 2013/0162502 A1* | 6/2013 | Lee | H04N 21/4122 345/1.2 |
| 2013/0222280 A1* | 8/2013 | Sheynblat | G06F 3/016 345/173 |
| 2014/0320431 A1* | 10/2014 | Cruz-Hernandez | G06F 3/0482 345/173 |
| 2014/0325448 A1* | 10/2014 | Han | G06F 9/452 715/835 |
| 2016/0062541 A1 | 3/2016 | Anzures et al. | |
| 2016/0162032 A1 | 6/2016 | Birnbaum et al. | |
| 2018/0275757 A1* | 9/2018 | Cruz-Hernandez | H01L 25/167 |

OTHER PUBLICATIONS

PCT Written Opinion, dated Nov. 9, 2017, in connection with International Application No. PCT/EP2017/067199, all pages.

Richard Moss, "Haptic technology: The next frontier in video games, wearables, virtual reality, and mobile electronics", http://www.gizmag.com/haptic-tech-vr-wearables-gamessightlence/35616/, Jan. 15, 2015, 12 pages.

John Gaudiosi, "Virtual Touch: Inside Technology That Makes VR Feel Real", http://www.rollingstone.com/culture/features/virtual-touch-inside-technology-that-makes-vr-feel-real-w438867, Rolling Stone, Sep. 13, 2016, 9 pages.

* cited by examiner

TRANSMISSION OF HAPTIC INPUT

TECHNICAL FIELD

This application relates to a haptic telecommunications device, a method and a computer-readable storage medium for improved transmission of tactile input.

BACKGROUND

Haptic, such as tactile or kinaesthetic, communication recreates the sense of touch by applying forces, vibrations, or motions to the user, which is commonly known as the tactile internet or haptic internet. This physical stimulation can be used to assist in the creation of virtual objects in a computer simulation, to control such virtual objects, and to enhance the remote control of machines and devices. Haptic devices may incorporate haptic sensors that measure forces exerted by the user on a user interface such as a haptic display. There are two sensory systems related to sense of touch in humans: kinaesthetic and tactile/cutaneous. For the purpose of this application they will all be referred to as being haptic and will be associated with active touch to communicate or recognize objects.

The haptic/tactile internet is seen as the next step in mobile networking. Users are currently able to efficiently communicate over voice and video, but in the future networked society it is envisioned that people will be able to communicate the sense of touch via haptic presentation devices. In the past years, there has been a large amount of research on devices which allow such communication to take place. Several new haptic devices are being developed, particularly ones that are able to be worn by the user such as gloves, vests, but also integrated in smartphones and smartwatches. New low cost mobile haptic presentation devices, are currently being developed by several companies such as Microsoft (NormalTouch and Texture Touch), Neurodigital (GloveOne), Tactai (Tactai Touch) for augmented reality and virtual reality applications. Various haptic actuator technologies are also being used such as ultrasound (e.g. ultrahaptics), vibrohaptic (e.g. Apple's Macbook), electrostatic, piezoelectric (e.g. TPad smartphone) and mechanical (e.g., MIT's Inform 3D displays).

With the advent of the 5G (fifth generation) telecommunications systems, it is envisioned that many telecommunication devices will be provided with haptic input and/or output means, such as haptic displays.

As is known, many different kind of telecommunication devices exist today, such as smartphones, internet tablets, gaming devices, and (laptop) computers to mention a few. All these have different physical characteristics, both between the categories and also inside each category. For example, smartphones are available in all different sizes, having a wide range of differently sized displays available.

Several solutions for handheld devices consider the interaction with a user interface (buttons, sliders, etc.) or they provide haptic feedback with respect to the image which is being displayed in the device's touchscreen. In other use cases, two users using a haptic presentation device may transmit the sense of touch to each other by interacting with the display in real-time. Each user receives haptic feedback with respect to the haptic properties (e.g. texture, friction, stiffness) of the user interface, image, object or the other user's finger on a specific location since the device is capable of tracking the user's finger position. The TPad smartphone is the first haptic smartphone and has been commercialized by a US startup since 2015. The phone is built upon a Motorola android phone with a piezoelectric actuated screen on top of it, which is able to generate various friction and texture effects via vibration.

The inventors of the inventions to be discussed herein, has, after insightful and inventive reasoning, envisioned and realized that there will be a problem in communicating haptic input/output, from hereafter called haptic data, as one haptic telecommunications device (a telecommunications device arranged with haptic input and/or output means) may not have the same type of haptic presentation device. Especially, if a haptic display is used, there may be a difference in size of the haptic presentation device of two haptic telecommunications devices communicating with one another. Haptic input received on one device may then be distorted when being presented on the second haptic telecommunications devices.

Consider the case where two users A and B want to perform haptic communications with each other using each a mobile device (e.g. smartphone, tablet, smartwatch, etc.), where each device is able to provide haptic feedback to each user, such as when the user touches the display with his/her finger(s).

In one scenario, user A may place its finger on top of its device's display, and the finger of user A is to be "haptically rendered" in user's B display, so that user B can feel the finger of user A. Similarly, users may be interacting via a game (e.g., users can perceive each other's touches and their joint interaction when manipulating objects) or may be performing remote teaching (e.g. user A teaching user B how to write).

The methods in the art do not consider the situation where the two haptic presentation devices have different capabilities. Such problems have been realized, identified and envisioned by the inventors of the teachings herein as will be discussed in greater detail below. To some degree, these problems resemble those of displaying web pages on internet devices having differently sized screens. In one type of such systems, the content to be displayed is scaled to fit the receiving display. In one type of such systems, the content to be displayed is rearranged to fit the receiving display.

The inventors have realized that as haptic data comprises both a location and a touch, such scaling is not possible without distorting the haptic data. Also, rearranging the haptic data will lead to a distortion of the haptic data, rendering it incorrect, with respect to location and/or size.

In view of the problems and shortcomings indicated above, there is a need for an improved manner of transmitting haptic data from one haptic telecommunications device to another haptic telecommunications device having different haptic output properties.

SUMMARY

The inventors of the present invention have realized, after inventive and insightful reasoning that there are envisioned problems as more and more haptic presentation devices come to the market as discussed above and below.

This invention proposes a method to infer and display haptic or haptic exploration and non-exploration regions in display devices with haptic feedback capabilities when performing haptic communication between (multiple) users.

It is therefore an object of the teachings of this application to overcome or at least mitigate one or more of the problems and shortcomings listed above and below by providing a method for use in a system comprising a transmitting haptic device, comprising a first haptic presentation device having an original set of haptic presentation properties, and a receiving haptic device, comprising a second haptic presentation device having a set of haptic presentation properties, said method comprising receiving haptic content in said transmitting haptic device; obtaining an alignment point for the haptic content according to said original haptic presentation properties; transmitting the haptic content to said second haptic device; obtaining a corresponding point to said alignment point according to the set of haptic presentation properties for the receiving haptic device; and presenting the haptic content in the receiving haptic device at the corresponding point.

In one embodiment the alignment point and/or (either one or both) the corresponding alignment points are obtained by being received as a point of touch of a respective user.

In one embodiment the alignment point and/or the corresponding alignment points are obtained by being determined based on the extension and location of the haptic content.

It is also an object of the teachings of this application to overcome or at least mitigate one or more of the problems and shortcomings listed above and below by providing a method for presenting haptic information on a haptic presenter configured to operate according to haptic presentation properties, said method comprising receiving the haptic content, wherein the haptic content is aligned according to original haptic presentation properties;

obtaining an alignment position according to said original haptic presentation properties;

obtaining a corresponding position according to the haptic presentation properties based on an alignment position according to said original haptic presentation properties; and presenting the haptic content at the corresponding position, wherein the presented haptic content corresponds to the received haptic content.

It is also an object of the teachings of this application to overcome or at least mitigate one or more of the problems and shortcomings listed above and below by providing a haptic device for presenting haptic information comprising a haptic presenter configured to operate according to haptic presentation properties and a controller configured to: receiving the haptic content, wherein the haptic content is aligned according to original haptic presentation properties; obtaining an alignment position according to said original haptic presentation properties; obtaining a corresponding position according to the haptic presentation properties based on an alignment position according to said original haptic presentation properties; and presenting the haptic content at the corresponding position, wherein the presented haptic content corresponds to the received haptic content.

It is also an object of the teachings of this application to overcome or at least mitigate one or more of the problems and shortcomings listed above and below by providing a method for use in a haptic device for receiving and transmitting haptic information comprising a haptic presenter configured to operate according to haptic presentation properties, said method comprising: receiving haptic content; obtaining an alignment point for the haptic content according to said original haptic presentation properties; and transmitting the haptic content to a second haptic device.

It is also an object of the teachings of this application to overcome or at least mitigate one or more of the problems and shortcomings listed above and below by providing a haptic device for receiving and transmitting haptic information comprising a haptic presenter configured to operate according to haptic presentation properties and a controller configured to: receive haptic content; obtain an alignment point for the haptic content according to said original haptic presentation properties; and transmit the haptic content to a second haptic device.

It is also an object of the teachings of this application to overcome or at least mitigate one or more of the problems and shortcomings listed above and below by providing a computer readable storage medium encoded with instructions that, when executed on a processor, perform the method according to herein.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
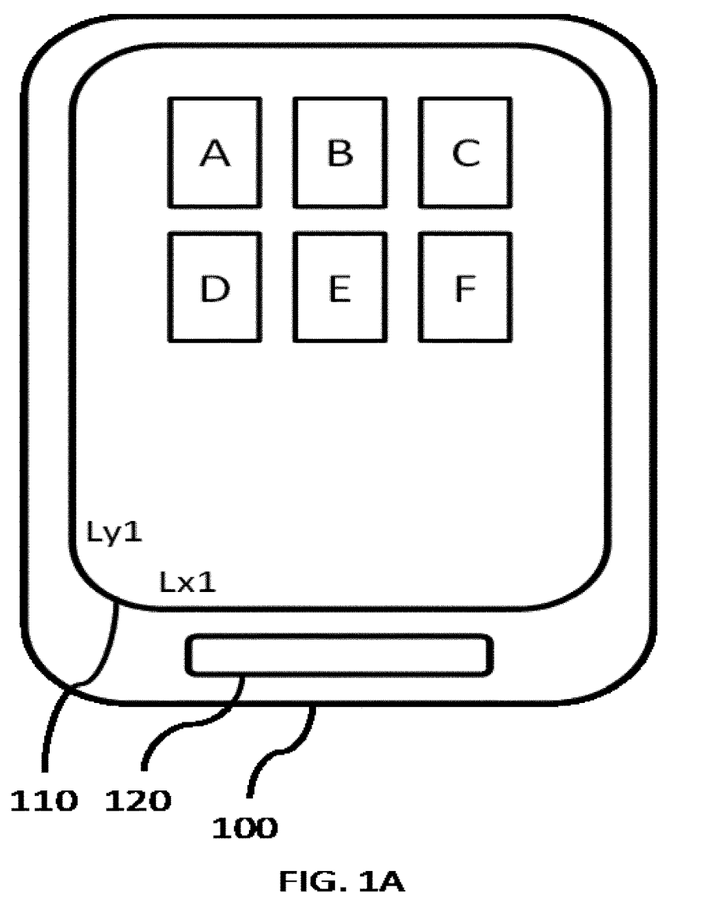
FIG. 1A shows a schematic overview of a haptic telecommunications device according to one embodiment of the teachings of this application.

FIG. 1A shows a schematic overview of haptic telecommunications device 100 according to one embodiment of the present invention. The haptic telecommunications device may be a robotic tool, a smartwatch, a smartphone, an internet tablet, a gaming device, or a (laptop) computer. In the following the haptic telecommunications device will be exemplified as being a smartphone 100.

In this disclosure, the term "haptic telecommunication device", "haptic device", etc. are used, and should be construed as a device capable of haptic, e.g. tactile or kinaesthetic, communication, sensing, and/or rendering.

The haptic telecommunications device 100 comprises a haptic presentation device 110 being able to output and/or receive haptic data. One example of such a haptic presentation device is a haptic display 110.

The haptic display 110 may be a touch display where a portion is arranged for receiving input of haptic data and for outputting haptic data. For the purpose of this application, the haptic display 110 of such an embodiment, the haptic display will be regarded as the portion of a touch display that is arranged for portion is arranged for receiving input of haptic data and for outputting haptic data, and thus also be a part of a user interface of the haptic telecommunications device 100.

The haptic display 110 is used as a touch sensitive display where a user provides input by touching the screen, however, not only the location of the touch is comprised in the received haptic data, but also the kind of touch, such as the pressure, the size of the touch and possibly also the texture or roughness (friction) of the touch. To output such haptic data, the haptic display is changed to purvey the kind of touch at the location of the touch. It should be noted that throughout this application tactile and haptic will be used interchangeably, but refer to the same manner of providing haptic data, namely input/output that can be felt at a specific location.

In FIG. 1A the display 110 is configured to present or display one or more objects A, B, C, D, F. The objects may be visual objects and/or haptic objects. The objects A-F may be associated with a function, such that when an object is selected and/or activated the associated function is executed. The user interface of the haptic device 100 may also comprise physical keys 120. In FIG. 1A a single key is shown, but it should be understood that any number of physical keys may be used depending on the design of the haptic device 100.

The display 110 has a display area defined by a horizontal extension Lx1 and a vertical extension Ly1, thereby providing the area Lx1×Ly1. The display area is an example of haptic presentation properties. Other such haptic presentation properties relate to the resolution of the display 110. The resolution and/or the actual size of the display 110 may thus be comprised in the haptic presentation properties.

Figure 1B:
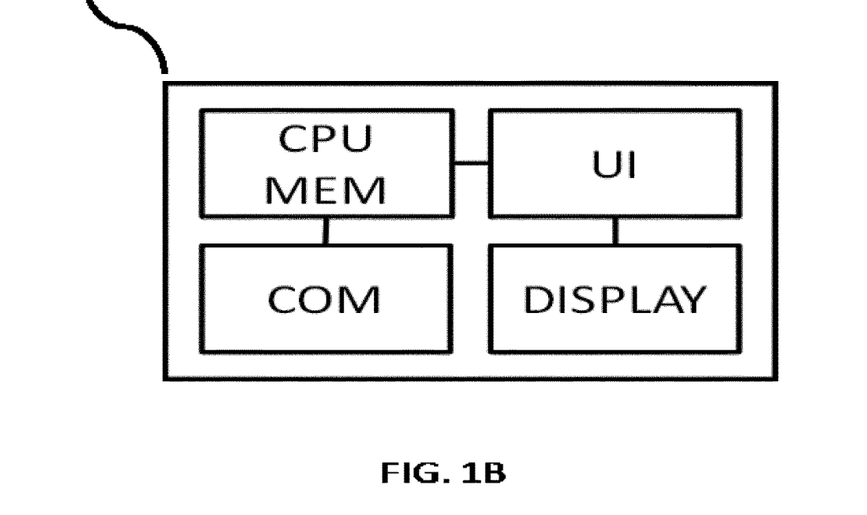
FIG. 1B shows a schematic overview of the components of a haptic telecommunications device according to one embodiment of the teachings of this application.

The haptic telecommunications device 100 may also comprise other input means such as one or several buttons or keys 120, being virtual and/or physical, perhaps part of a traditional touch display. As a skilled person would understand, many options exist and this application will not go into detail about all possible combinations, but only give an example of one button 120, but it should be understood that many variations exist and are all considered to be represented by the button 120. FIG. 1B shows a schematic view of the components of a haptic device 100. A controller CPU is configured to control the overall and also specific functions of the haptic device 100 such as by executing computer program instructions loaded into or stored on a memory connected or being part of the controller. The controller may comprise one or more processors or other logic programmable circuits for combined or individual execution of a task or application. However, for the purpose of this application they will be seen as being the one and same controller CPU. The controller CPU is connected to a memory MEM for storing computer instructions and also data to be processed by the computer instructions when executed by the controller CPU. The memory may comprise one or several memory circuits, possibly arranged in a hierarchy. One or more of such memory circuits may be comprised in the controller CPU. For the purpose of this application the memory circuits will be regarded as one memory MEM.

The controller CPU is also connected to a user interface UI for receiving input from a user and for presenting data or other information to the user. As discussed above, a haptic display is comprised in the user interface UI.

The controller is also connected to a communications interface COM, such as a Radio frequency interface. The RF interface may be configured to operate according to a long range standard, such as a cellular network standard, for example a 5G standard. The RF interface may alternatively or additionally be configured to operate according to a short range standard, such as a Bluetooth®, IEEE802.11b (WiFi™), IEEE802.16, ZigBee™ or NFC™ (Near Field Communication) standard, for example a 5G standard.

The communications interface COM enables a first haptic device 100 to communicate with a second haptic device (referenced 100A and 100B in FIG. 2 and as will be discussed in greater detail with reference to FIG. 2) for receiving and/or transmitting visual and haptic data.

Figure 2A:
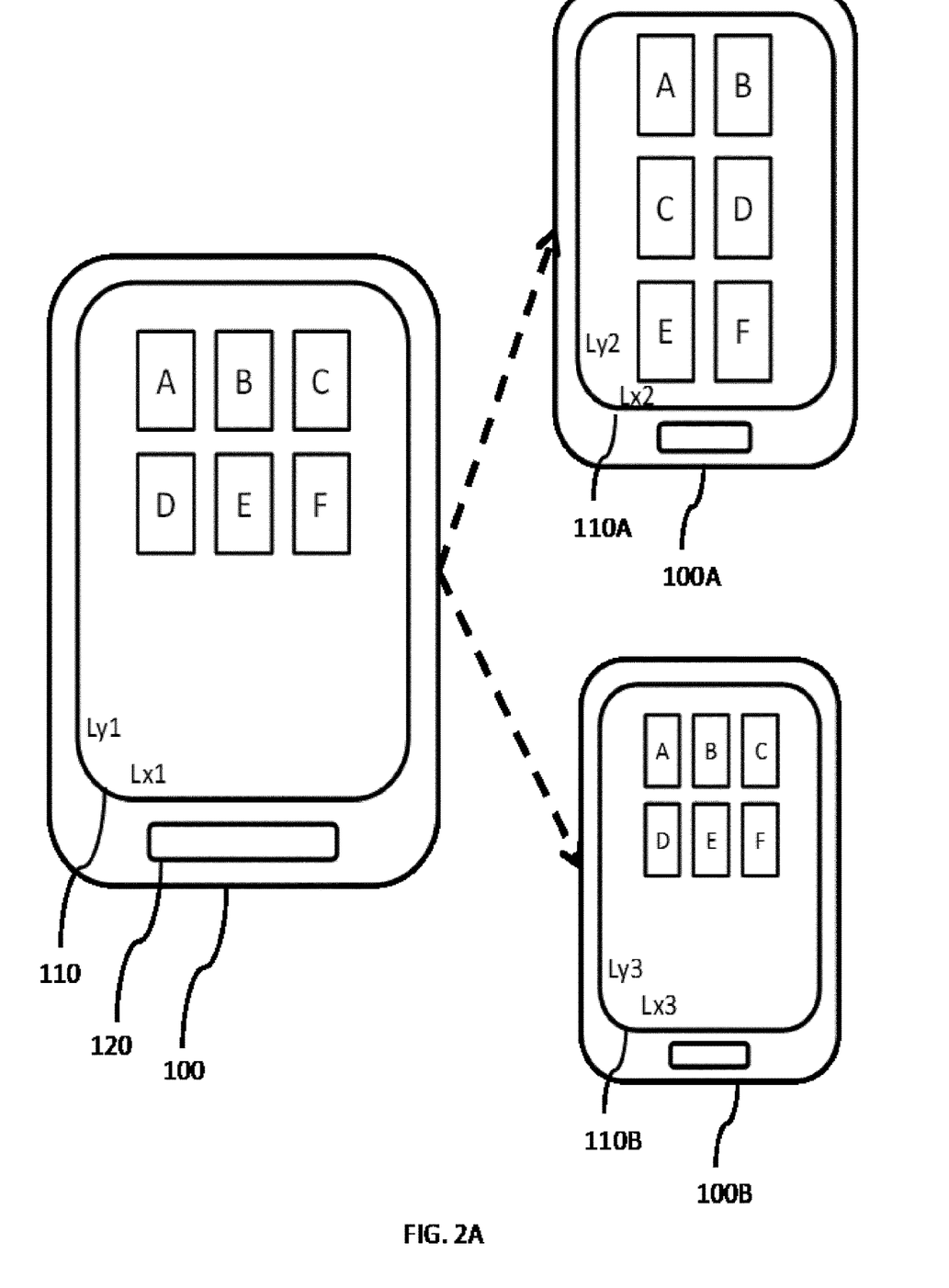
FIG. 2A shows a schematic view of an example haptic telecommunications device system according to one embodiment of the teachings of this application.

FIG. 2A shows a communication system in which a first haptic device 100 is communicating (as indicated by the dashed arrows) with a second haptic device 100A. The first haptic device 100 is also shown as communicating (as indicated by the dashed arrows) with another second haptic device 100B. The first haptic device 100 may be a haptic device 100 as disclosed with reference to FIG. 1A and FIG. 1B. Either of the second haptic devices 100A, 100B may also be a haptic device 100 as disclosed with reference to FIG. 1A and FIG. 1B.

Figure 2B:
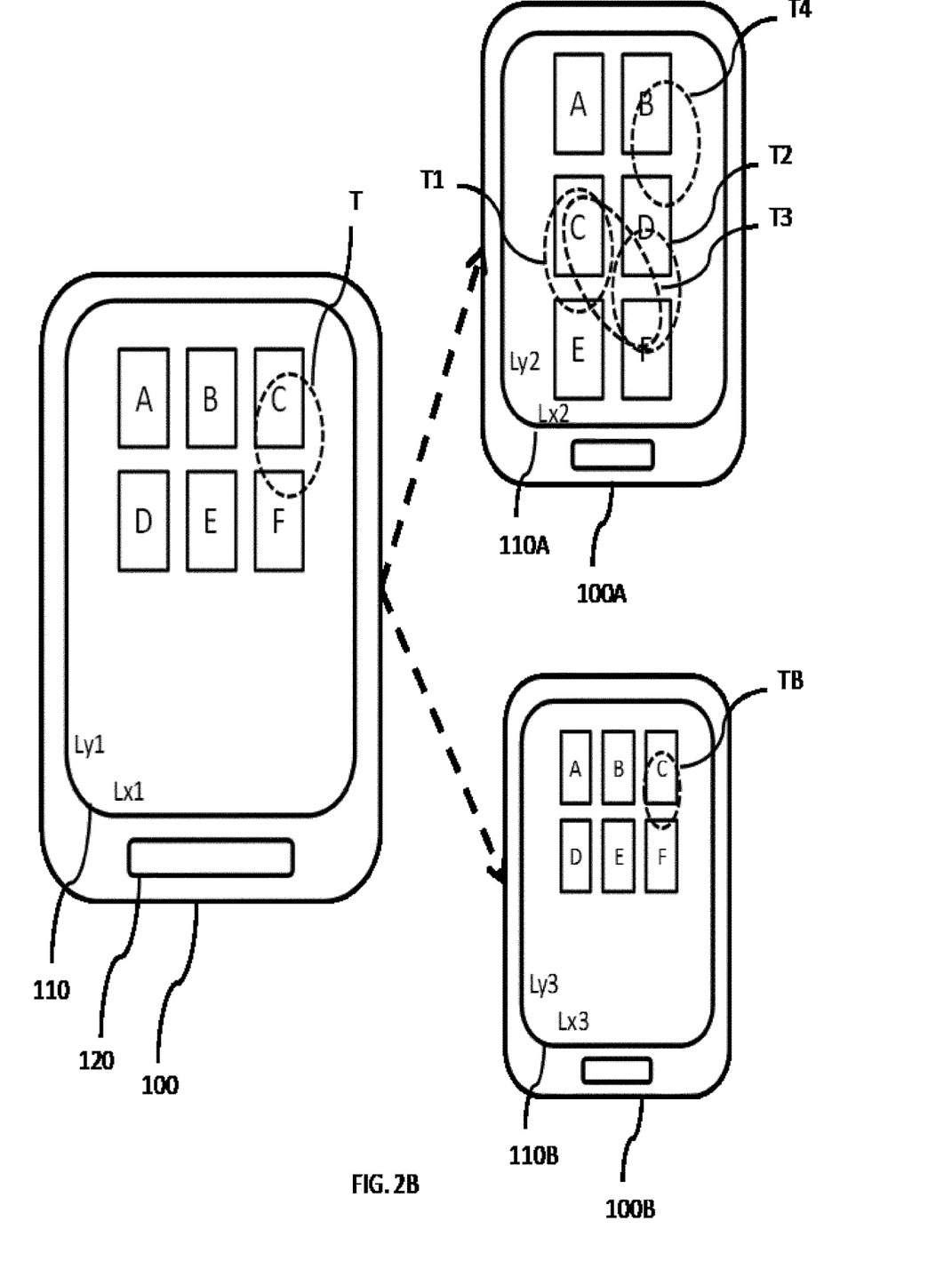
FIG. 2B shows a schematic view of an example haptic telecommunications device experiencing envisioned problems according to an aspect of the teachings of this application.

FIGS. 2A and 2B show problem situations that the inventors of the present application have identified and realized that the problems of FIG. 2A may occur. As discussed above, the haptic device 100 is configured to transmit and/or receive both visual (or graphic) content as well as haptic content.

FIG. 2A shows how the graphical content is traditionally displayed when being transmitted from the first haptic device 100 to a second haptic device 100A, 100B having different display capabilities. As can be seen from FIG. 2A, the second haptic device 100A has a different display size Lx2×Ly2 than that of the first haptic device 100. In this example, the display 110A of the second haptic device 100A is smaller than the display 110 of the first haptic device 100 in both extensions, but it should be noted that any variance (bigger/smaller) in any or both extensions is possible and fall under the scope of this invention.

The other second haptic device 100B also has a display 110B having different display size than that of the first haptic device 100.

As the visual content is transmitted from the first haptic device 100 to the second haptic device 100A, the second haptic device 100A may be configured to simply rearrange the graphical content, i.e. the objects A-F, according to the display size of the display 110A of the second haptic device 100A. As is seen in FIG. 2A, the second haptic device 100A displays the objects A-F in a 2×3 matrix, instead of a 3×2 matrix as is done by the first haptic device 100.

Alternatively or additionally, and as the other second haptic device 100B is configured to, the second haptic device 100B scales the graphical objects A-F according to the display size of the display 110B of the second haptic device 100B. A simple scaling factor may be determined as S=(Sx;Sy), where Sx=Lx3/Lx1 and Sy=Ly3/Ly1 and any coordinate for the display 110B of the second haptic device 100B may be determined by multiplying the scaling factor with the corresponding coordinate for the display 110 of the first haptic device 100.

However, the inventors have realized and discovered that the straightforward manner of adapting visual or graphic content does not work equally well when transmitting haptic content as will be shown in FIG. 2B showing a same communication system as in FIG. 2A, but where haptic content is also shown. For example, if haptic content is input through the display 110 of the first haptic device 100, as indicated by the oval circle referenced T, the haptic content would be distorted if rearranged as the graphical content being presented on the second haptic device 100A.

The haptic content T received may be seen as overlapping the object C. In such an instance a rearrangement would result in a haptic presentation T1 overlapping C, which results in a distorted haptic content as the haptic content now also overlaps object E.

The haptic content T received may be seen as overlapping the object F. In such an instance a rearrangement would result in a haptic presentation T2 overlapping F, which results in a distorted haptic content as the haptic content now also overlaps object D.

The haptic content T received may be seen as overlapping two objects, C and F. In such an instance a rearrangement would result in a haptic presentation T3 overlapping both C and F, which results in a distorted haptic content in that the shape and extension is changed.

The haptic content T received may be seen as being received in the upper right corner. In such an instance a rearrangement would result in a haptic presentation T4 overlapping B and possibly also D, which results in a distorted haptic content as the haptic content now overlaps objects B and D and not C and/or F.

The rearrangement that is useful for graphical content is thus not useful for haptic content.

Similarly, as is shown by the first haptic device 100 transmitting haptic content to the other second haptic device 100B, the scaling that is useful for graphical content is also not useful for haptic content.

If the haptic content is scaled according to the scaling factor S, the resulting haptic content TB will be distorted as it will differ in size from the haptic content T of the first haptic device 100. If the haptic content T is the impression of for example a finger, the resulting haptic content TB may not be identifiable as a finger as its size may be too small (or large).

To overcome this problem, that the inventors have realized, a simple solution is presented by the inventors, namely to separate the transformation or adaptation of the graphical content from the adaptation of the haptic content.

Figure 3:
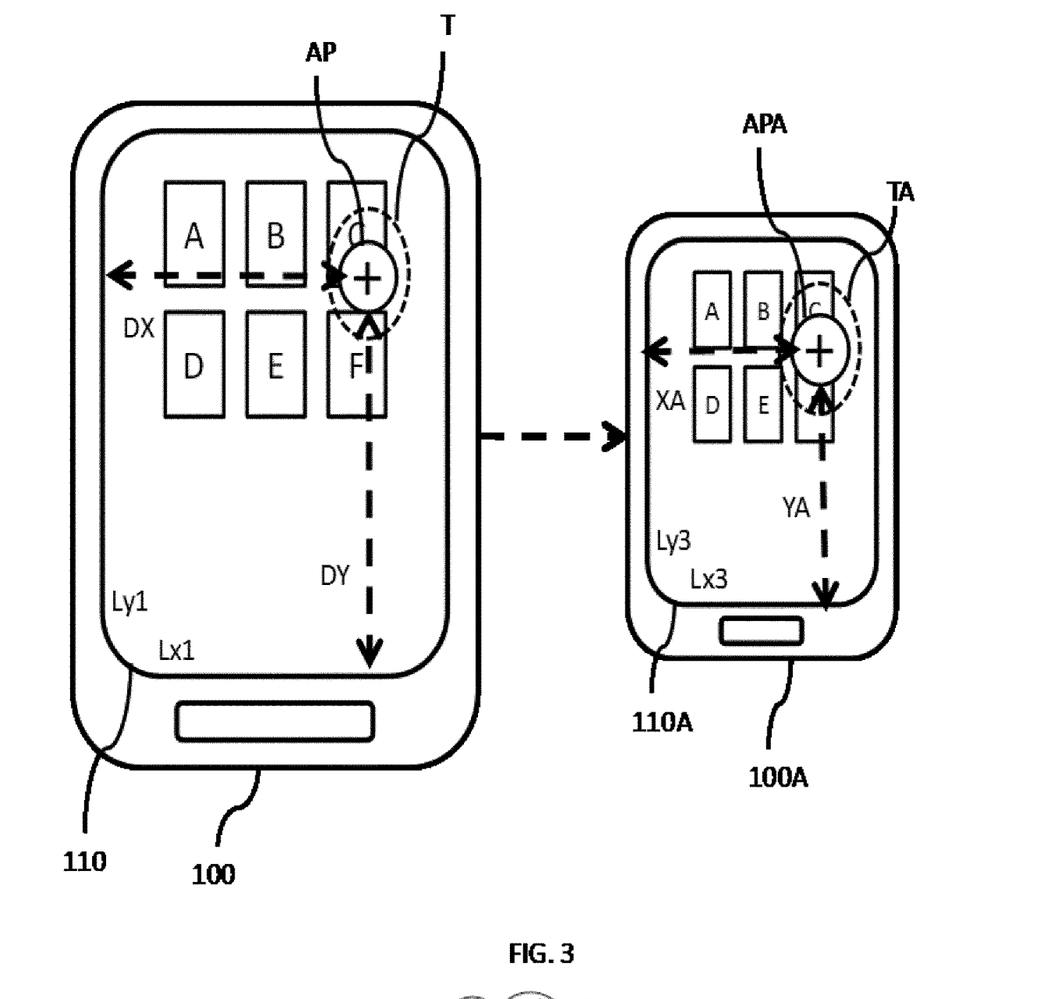
FIG. 3 shows a schematic view of an example haptic telecommunications device system according to one embodiment of the teachings of this application.

FIG. 3 shows a communication system wherein a first haptic device 100 is communicating with a second haptic device 100A. The first haptic device 100 and the second haptic device 100A may both or either be a haptic device 100 as in FIG. 1A and FIG. 1B.

As in FIG. 2B a haptic object T is received (through the UI or through the communication interface to be presented through the UI) at a position (DX;DY).

As the haptic object is to be transferred to another device, an alignment point AP is obtained by the controller. In one embodiment the alignment point is obtained as the point of initial touch for a user interaction.

In one embodiment the alignment point is obtained by being determined by the controller such as being. The AP may correspond to the graphical centre of gravity of the haptic object T, such as indicated in FIG. 3 by the coordinates (DX;DY). In such an embodiment, the alignment point is easy to align in the rescaled presentation. In one embodiment the alignment point may correspond to a corner of the haptic content T, such as a lower left corner. In such an embodiment, the alignment point is easily determined as the first coordinates for the haptic object.

In one embodiment the alignment point may correspond to an upper edge of the haptic content T. In such an embodiment, the alignment point represents what the user is most likely aiming at.

The alignment point may be obtained by the transmitting first device 100. The alignment point may also be obtained by the receiving second haptic device 100A.

If the alignment point is obtained by the sending haptic device 100 it may be transmitted along with the haptic object, and/or it may be transmitted upon a query from the second haptic device 100A.

In one embodiment the second haptic device 100A receiving the haptic content is configured to present the haptic content at a position corresponding to an alignment point APA, where the corresponding alignment point corresponds to a point whose coordinates are scaled coordinates for the original haptic content T. In FIG. 3 the corresponding or scaled alignment point APA I located at the coordinates (XA;YA)=S(DX;DY)=(Sx×DX; Sy×DY) or (XA=Sx*DX; YA=SY*DY).

In one embodiment the second haptic device 100A receiving the haptic content is configured to present the haptic content at corresponding alignment point APA, where the receiving device is configured to obtain the alignment point as a point of (initial or current) touch of a user of the receiving device.

It should be noted that in such an embodiment, the received haptic content may be transmitted without any alignment point. The haptic content may also be presented without any scaling, the only adaptation of the haptic content being that it is presented at an alignment point selected by the receiving user, not by the transmitting user.

In such an embodiment, the user of the transmitting device thus input his haptic content and an alignment point is obtained. As stated above, it may be obtained as the initial point of touch, or it may be determined by the controller. The haptic content is then transmitted to the receiving device, which may obtain the corresponding alignment point by receiving the current or initial touch of the user of the receiving device. The transmitted haptic content will then be presented at the point where the receiving user is touching.

The second device 100B may further be configured to present or display any graphical content by scaling the graphical content both with regards to the position and the extension of the graphical content.

It should be noted that in such embodiment where the alignment point and the graphical content are scaled, moved or translated, and not the extension of the haptic content, the haptic content will remain true to its form and not be shapewise distorted. And as the alignment point or position of the haptic content is scaled in the same manner as the graphical content the haptic content is also not distorted with regards to what objects it overlaps or is adjacent to.

Any haptic object in the haptic content will thus be presented true to its form, i.e. TA=T in all respects apart from its (absolute) position.

The alignment point may be determined for one haptic object, as in FIG. 3, or it may be for a group of haptic objects, wherein their individual relative distances may be scaled. In one embodiment, a group of haptic objects may be regarded and treated as one haptic object, and the individual relative distances be maintained.

Figure 4:
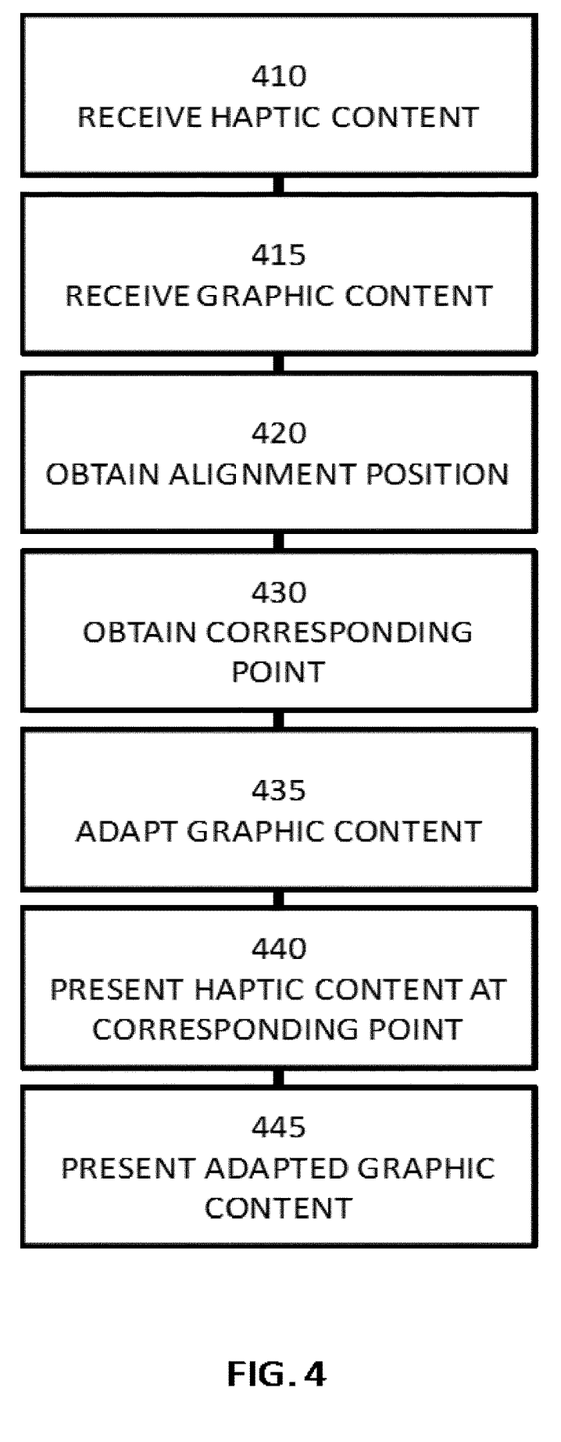
FIG. 4 shows a flowchart for a general method of controlling a telecommunications device according to the teachings herein.

FIG. 4 shows a flowchart for a general method according to herein for presenting haptic information on a haptic presenter (such as a haptic display) configured to operate according to a presenter (display) size. The size may be represented by a coordinate system such as a resolution, but it may also or alternatively be represented by a physical size representation. The haptic device 100 receives 410 the haptic content (from memory, from a UI, or from a communications interface), wherein the haptic content is aligned according to an original presenter size, as an example of a presenter property. Graphic content is also received 415. An alignment position according to said original presenter size for the haptic content is obtained 420. The alignment point may be obtained by being received or by being calculated.

A corresponding position according to said receiving presenter size is also obtained 430. The corresponding position is defined as a scaled version of the alignment position according to the original presenter size. The corresponding alignment point may be obtained by being received or by being calculated. If the corresponding alignment point is obtained by being received, the reception of the alignment point according to the original presenter size is optional.

The graphic content is adapted 435 (rearranged and/or scaled) based on the properties of the sending presentation device to fit the receiving presentation device. The haptic device then presents 440 the haptic content at the corresponding position, wherein the presented haptic content corresponds to the received haptic content and also presents 445 the adapted graphic content.

As disclosed in the above the haptic presentation properties may relate to a physical size of the display, an orientation of the display and/or a resolution of the display 110 including any combination thereof or partially thereof.

A scaling when relating to the physical size would thus be based on the physical sizes of the displays 110, 110A. Similarly, a rearrangement when relating to the physical size would thus be based on the physical sizes of the displays 110, 110A.

A scaling when relating to the resolution would thus be based on the physical sizes of the displays 110, 110A. Similarly, a rearrangement when relating to the resolution would thus be based on the physical sizes of the displays 110, 110A.

A scaling when relating to the orientation would thus be based on the physical sizes of the displays 110, 110A. Similarly, a rearrangement when relating to the orientation would thus be based on the physical sizes of the displays 110, 110A.

To phrase differently, the object to be displayed in the device is based on a visual model (representing the graphical content) and a haptic model (representing the haptic content). The visual model is for example an image, video or computer generated graphics. A haptic model is composed by geometric and physical properties of the object, which are mapped into the visual model of the object. The geometric properties follow directly from the pixels (2D) or voxels (3D) of the image/video/graphics, while the physical properties (e.g., stiffness, friction, temperature, texture, etc.) are typically encoded in each of the pixels or voxels, or regions of pixels or voxels, for the 2D or 3D case, respectively.

As also discussed above, in the event the object model dimensions (i.e. according to the original presentation properties) are larger than the device display, a scaling of the visual model is proposed. In an example embodiment, the visual model is scaled to fit the display. In another example embodiment, the visual model is scaled in a way that all the object area is inside the display, but the distance between the display edge and the object contour is set to a minimum distance D mm. In this way, one is able to have D mm on the side of the object to be provided with haptic feedback via the display. Accordingly, a given scaling factor S is used to convert the non-scaled visual model into the scaled visual model.

The object is displayed according to the scaled object model as described above.

For the haptic content, a user finger input may be measured and its position in the display (X,Y), is related to the position (Xv',Yv') in the scaled visual model, which corresponds to position (Xv,Yv) in the non-scaled visual model, given the scaling factor S.

The haptic feedback is given to the user at position (X0,Y0), the alignment point, in the display coordinates, based on the haptic model at position (Xv,Yv) (corresponding to the corresponding point). Hence, as the user moves in any direction, the haptic feedback will always correspond to the unscaled haptic model.

A translation of (dX, dY) with respect to the initial position of the user finger in the display, corresponds to the user finger located at position (X0+dX,X0+dY) in the display coordinates. This corresponds to position (Xv+dX,Yv+dY) in the haptic model coordinate system. In such an embodiment, the translation of the haptic content is not scaled preserving the haptic input true to its original form and also movement.

In one embodiment, any translation of the haptic content is adapted in the same manner as the corresponding point is determined based on the alignment point. In such an embodiment, the translation may thus result in a scaled translation and/or a rearranged translation.

A scaled translation is determined as a scaling of the translation based on the original haptic presentation properties and the haptic presentation properties of the receiving haptic device. This enables the haptic content to maintain its position with regards to surrounding objects.

A rearranged translation enables the haptic movement to end or follow at an object that the haptic content moves to or by in the original presentation.

Figure 5:
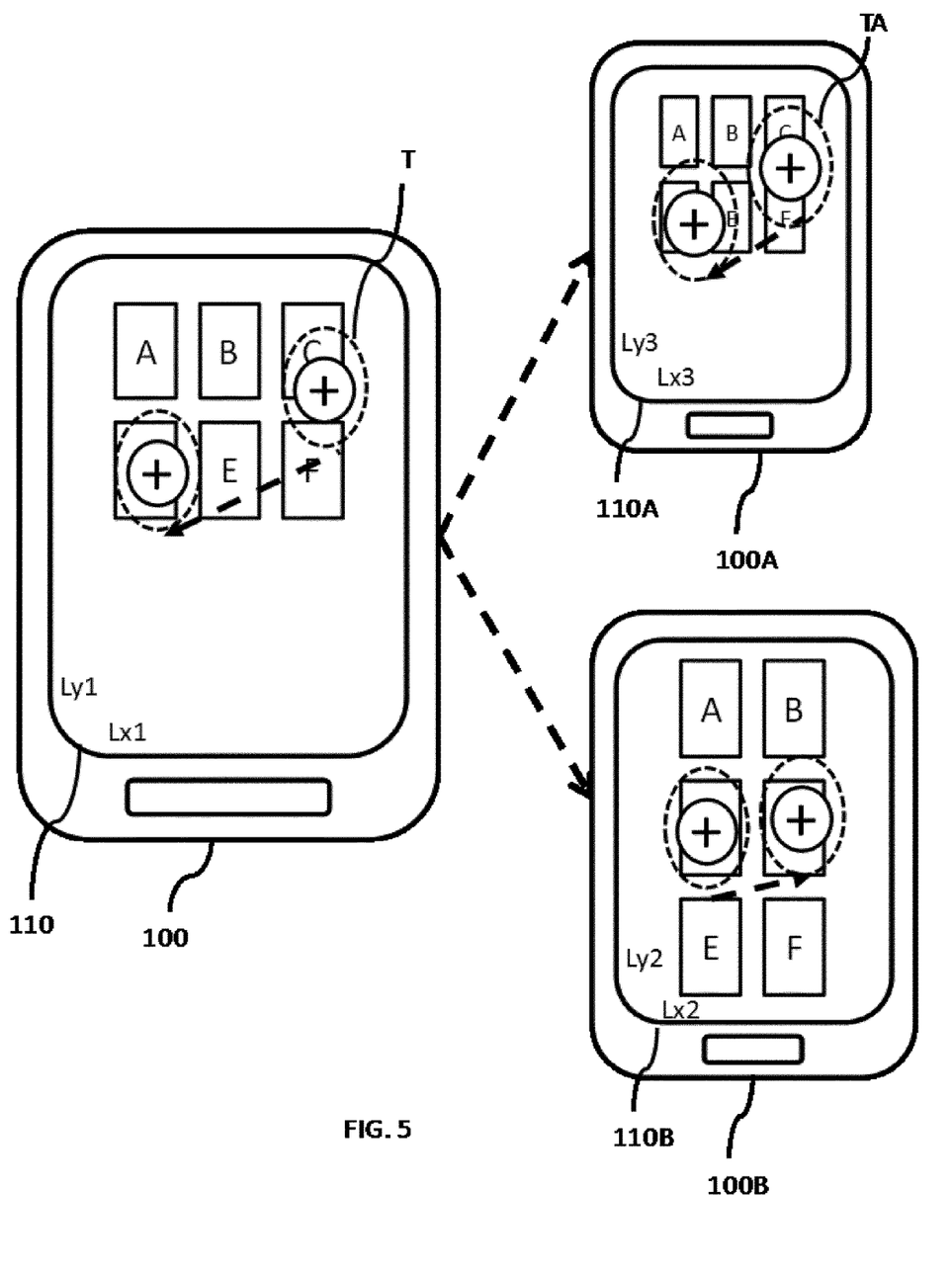
FIG. 5 shows a schematic view of an example haptic telecommunications device system according to one embodiment of the teachings of this application.

FIG. 5 shows a schematic view of a communication system where a first haptic communications device 100 transmits graphic and haptic content to a second communications device 100A and third haptic communications device 100B, where the haptic content is translated. As can be seen, the translation of the haptic content may be scaled as when transmitting from the first haptic communications device 100 to the second haptic communications device 100A. Here the translation has been scaled so that the haptic content translates from the same (object C) and to the same objects (object D).

As can also be seen, the translation of the haptic content may also or alternatively be rearranged as when transmitting from the first haptic communications device 100 to the third haptic communications device 100B. Here the translation has been rearranged so that the haptic content translates from the same (object C) and to the same objects (object D).

In one embodiment, the translation is adapted in the same manner as the corresponding alignment point based on the alignment point and the presentation properties.

As has been discussed in the above, the alignment point and the corresponding alignment points may be determined as the point of touch of a device's user.

The alignment point of the haptic content being received at the transmitting device provides an origin for the haptic content, where descriptors of the haptic content are given relative the alignment point. The alignment point of the receiving device is then received as the point that should be the new origin for the haptic content and all descriptors of the haptic content are given relative the corresponding alignment point.

In such an embodiment, the content may also be scaled as in the description above to accommodate for different display sizes.

Figure 6:
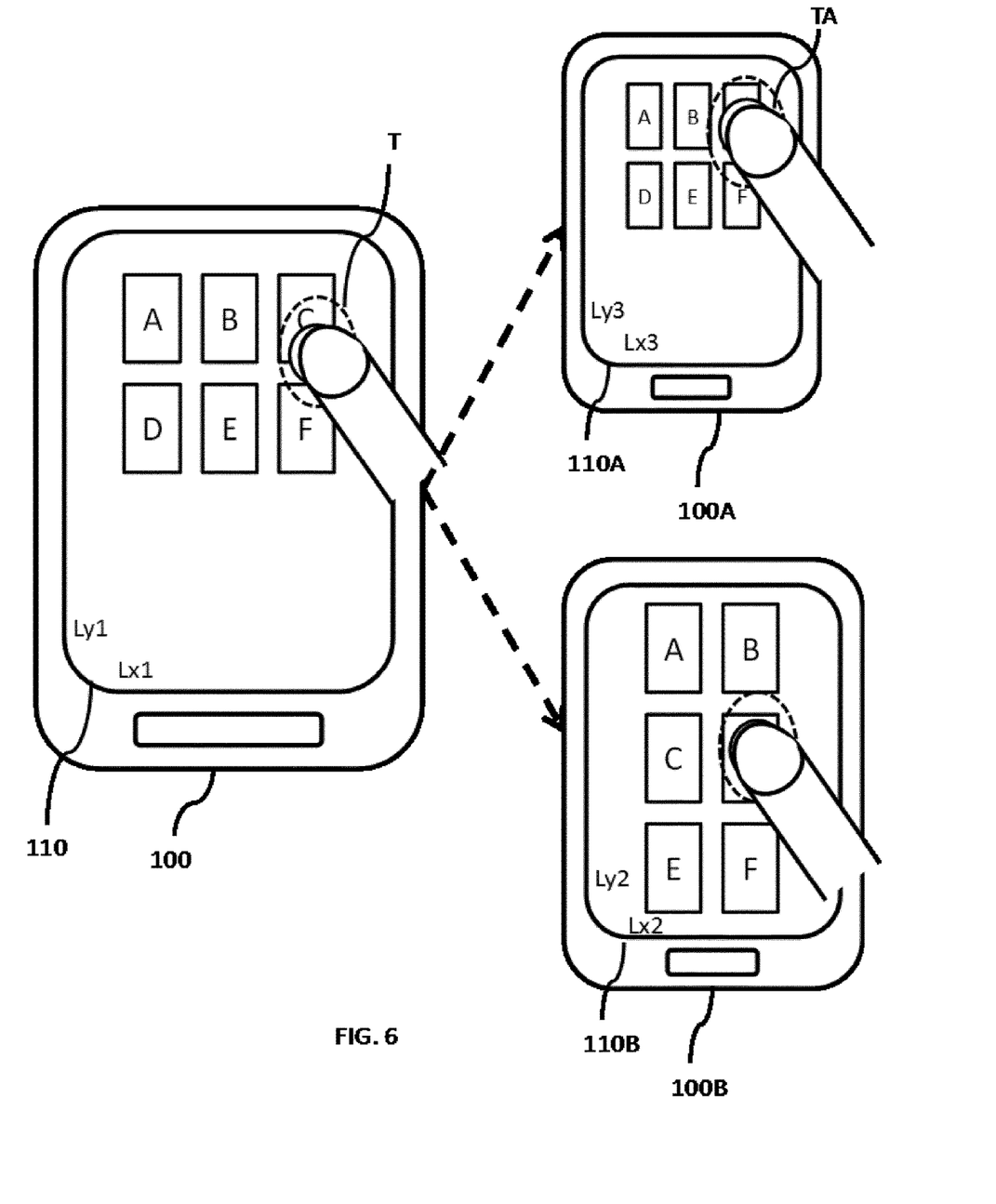
FIG. 6 shows a schematic view of an example haptic telecommunications device system according to one embodiment of the teachings of this application.

FIG. 6 shows a schematic view of a communication system where a first haptic communications device 100 transmits graphic and haptic content to a second communications device 100A and third haptic communications device 100B. The haptic content T is received at a point where a user's finger (or other object) touches the display 110. The alignment point for the transmitting device is then obtained as the point of touch of the user of the transmitting device. In this example the touch of point is at a location corresponding to object C.

The second and third device, i.e. the receiving devices, also obtain their alignment points by receiving a point of touch of their respective users. The haptic content is consequently presented at those points which in the case of the second device 100A is at a location corresponding to object C and in the case of the third device 100B is at a location corresponding to object D.

The haptic devices are thus enabled to present the haptic content, scaled or unscaled, at a position where a user is touching which ensures that the haptic content is perceived by the receiver.

The haptic model could contain different haptic sensations related to e.g. size, shape, mass, texture and stiffness of physical objects, surfaces, etc. When the model allows these to be separately rendered, they may have different scaling factors. For example, while the user has not yet triggered an alignment point but still explores the haptic/visual model a scaled haptic model representing the size and shape of objects corresponding to the visual scaled model. When the user triggers an alignment point the unscaled haptic model is used for realistic texture and stiffness of objects.

Triggering of alignment point can be done in several ways.

One trigger is when the user touches the display with one finger/pointing device. Which only allows for one level of scaling of the model.

One trigger is when different number of fingers are used to distinguish between exploring the scaled or unscaled partial haptic model. For example, two fingers used to for scaled haptic model of object size and shape and one finger for triggering the alignment point and exploring the texture and stiffness.

One trigger is when similar to the above one, but a force sensitive display is used to distinguish between the unscaled and aligned partial haptic model or the scaled model.

The haptic feedback may not be only provided based on the user finger position, but also on the user finger speed and force applied.

The haptic feedback is limited to the display region where haptic feedback is possible.

Figure 7:
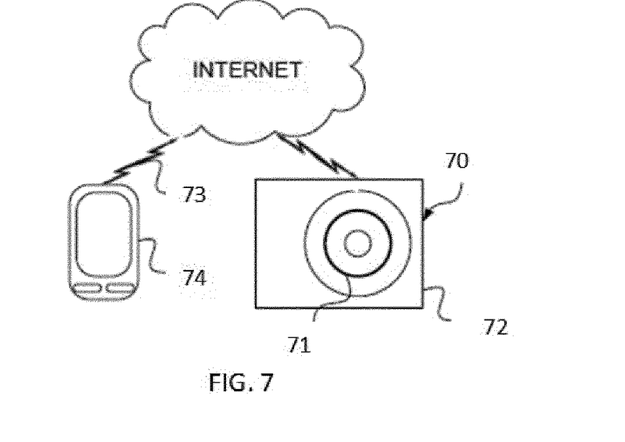
FIG. 7 shows a schematic view of a computer-readable medium according to the teachings herein.

FIG. 7 shows a schematic view of a computer-readable medium as described in the above. The computer-readable medium 70 is in this embodiment a data disc 70. In one embodiment the data disc 70 is a magnetic data storage disc. The data disc 70 is configured to carry instructions 71 that when loaded into a controller, such as a processor such as the controller 160 of the haptic telecommunications device 100 of FIGS. 1A and 1B, execute a method or procedure according to the embodiments disclosed above. The data disc 70 is arranged to be connected to or within and read by a reading device 72, for loading the instructions into the controller. One such example of a reading device 72 in combination with one (or several) data disc(s) 70 is a hard drive. It should be noted that the computer-readable medium can also be other mediums such as compact discs, digital video discs, flash memories or other memory technologies commonly used. In such an embodiment the data disc 70 is one type of a tangible computer-readable medium 70.

The instructions 71 may also be downloaded to a computer data reading device 74, such as the controller 160 or other device capable of reading computer coded data on a computer-readable medium, by comprising the instructions 71 in a computer-readable signal 73 which is transmitted via a wireless (or wired) interface (for example via the Internet) to the computer data reading device 74 for loading the instructions 71 into a controller. In such an embodiment the computer-readable signal 73 is one type of a non-tangible computer-readable medium 70. The instructions may be stored in a memory (not shown explicitly in FIG. 7, but referenced 160 in FIG. 1B) of the computer data reading device 74.

The instructions comprising the teachings according to the present invention may thus be downloaded or otherwise loaded in to a haptic telecommunications device 100 in order to cause the haptic telecommunications device 100 to operate according to the teachings of the present invention.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for use in a system comprising a transmitting haptic device, comprising a first haptic presentation device having an original set of haptic presentation properties, and a receiving haptic device, comprising a second haptic presentation device having a second set of haptic presentation properties, said method comprising:

receiving haptic content in said transmitting haptic device;

obtaining an alignment point for the haptic content according to said original set of haptic presentation properties in said transmitting haptic device, wherein the original set of haptic presentation properties relates to one or more of:
- a size of the first haptic presentation device; and
- an orientation of the first haptic presentation device;

transmitting, by said transmitting haptic device, the haptic content to said receiving haptic device;

obtaining, in said receiving haptic device, a corresponding point to said alignment point according to the second set of haptic presentation properties for the receiving haptic device, wherein the second set of haptic presentation properties relates to one or more of:
- a size of the second haptic presentation device; and
- an orientation of the second haptic presentation device; and presenting the haptic content in the receiving haptic device at the corresponding point, wherein the original set of haptic presentation properties is different from the second set of haptic presentation properties.

2. The method of claim 1, further comprising:
receiving graphic content in said transmitting haptic device;
transmitting the graphic content to said second haptic device;
adapting the graphic content according to said original set of haptic presentation properties and said second set of haptic presentation properties; and
presenting the graphic content.

3. The method of claim 1, wherein the original haptic presentation properties further relate to a resolution of the first haptic presentation device and the second set of haptic presentation properties further relate to a resolution of the second haptic presentation device.

4. The method of claim 1, wherein the original haptic presentation properties relate to the size of the first haptic presentation device and the second set of haptic presentation properties relate to the size of the second haptic presentation device.

5. The method of claim 1, wherein the original haptic presentation properties relate to the orientation of the first haptic presentation device and the second set of haptic presentation properties relate to the orientation of the second haptic presentation device.

6. The method of claim 1, wherein the corresponding point is a scaled version of the alignment point and wherein graphic content received in said transmitting haptic device is adapted according to a scaling based on the second set of haptic presentation properties and the original set of haptic presentation properties.

7. The method of claim 1, wherein the corresponding point is a rearranged version of the alignment point and wherein graphic content received in said transmitting haptic device is adapted according to a rearrangement based on the second set of haptic presentation properties and the original set of haptic presentation properties.

8. The method according to claim 1, wherein the alignment point is obtained as a point of touch of a user of the transmitting haptic device.

9. The method according to claim 1, wherein the alignment point is determined as a position for the haptic content.

10. The method according to claim 1, wherein the corresponding point to said alignment point is obtained as a point of touch of a user of the receiving haptic device.

11. The method according to claim 1, wherein the corresponding point to said alignment point is determined as a scaled position for the haptic content.

12. The method according to claim 1, wherein the corresponding point to said alignment point is determined as a rearranged position for the haptic content.

13. The method of claim 1, further comprising scaling a translation of the haptic content.

14. The method of claim 1, further comprising rearrangement of a translation of the haptic content.

15. The method of claim 1, wherein at least one of the first haptic presentation device and the second haptic presentation device is a display configured for haptic presentation.

16. A method for presenting haptic information on a haptic presenter configured to operate according to haptic presentation properties, said method comprising:
receiving haptic content, wherein the haptic content is aligned according to original haptic presentation properties;
obtaining an alignment point according to said original haptic presentation properties, wherein the original haptic presentation properties relate to one or more of:
- a size of the original haptic presentation device; and
- an orientation of the original haptic presentation device;

obtaining a corresponding point according to the haptic presentation properties of the haptic presenter based on the alignment point according to said original haptic presentation properties, wherein the haptic presentation properties of the haptic presenter relate to one or more of:
- a size of the haptic presenter; and
- an orientation of the haptic presenter; and presenting the haptic content at the corresponding point, wherein the presented haptic content corresponds to the received haptic content, wherein the original haptic presentation properties is different from the haptic presentation properties of the haptic presenter.

17. A haptic device for presenting haptic information comprising:
a haptic presenter configured to operate according to haptic presentation properties; and
a controller configured to:
receive haptic content, wherein the haptic content is aligned according to original haptic presentation properties;
obtain an alignment point according to said original haptic presentation properties, wherein the original haptic presentation properties relate to one or more of:
- a size of the original haptic presentation device; and
- an orientation of the original haptic presentation device;

obtain a corresponding point according to the haptic presentation properties of the haptic device based on the alignment point according to said original haptic presentation properties, wherein the haptic presentation properties of the haptic device relate to one or more of:
- a size of the haptic device; and
- an orientation of the haptic device; and present the haptic content at the corresponding point, wherein the presented haptic content corresponds to the received haptic content, wherein the original haptic presentation properties is different from the haptic presentation properties.

18. A non-transitory computer readable storage medium encoded with instructions that, when executed on a processor, perform a method for use in a system comprising a transmitting haptic device, comprising a first haptic presentation device having an original set of haptic presentation properties, and a receiving haptic device, comprising a second haptic presentation device having a second set of haptic presentation properties, said method comprising:
- receiving haptic content in said transmitting haptic device;
- obtaining an alignment point for the haptic content according to said original set of haptic presentation properties in said transmitting haptic device, wherein the original set of haptic presentation properties relates to one or more of:
  - a size of the first haptic presentation device; and
  - an orientation of the first haptic presentation device;
- transmitting, by said transmitting haptic device, the haptic content to said receiving haptic device;
- obtaining, in said receiving haptic device, a corresponding point to said alignment point according to the second set of haptic presentation properties for the receiving haptic device, wherein the second set of haptic presentation properties relates to one or more of:
  - a size of the second haptic presentation device; and
  - an orientation of the second haptic presentation device; and
- presenting the haptic content in the receiving haptic device at the corresponding point,
- wherein the original set of haptic presentation properties is different from the second set of haptic presentation properties.

* * * * *